United States Patent [19]

Heitmann et al.

[11] 4,281,670

[45] Aug. 4, 1981

[54] APPARATUS FOR INCREASING THE PERMEABILITY OF WRAPPING MATERIAL FOR ROD-SHAPED SMOKERS PRODUCTS

[75] Inventors: Uwe Heitmann, Schwarzenbek, Fed. Rep. of Germany; Joachim Buchegger, Richmond, Va.; Werner Hinz, Hamburg, Fed. Rep. of Germany

[73] Assignee: Hauni-Werke Körber & Co. KG, Hamburg, Fed. Rep. of Germany

[21] Appl. No.: 834,645

[22] Filed: Sep. 19, 1977

Related U.S. Application Data

[63] Continuation-in-part of Ser. No. 805,712, Jun. 13, 1977, abandoned, which is a continuation-in-part of Ser. No. 766,927, Feb. 9, 1977, Pat. No. 4,121,595.

[51] Int. Cl.$^3$ ............................................ A24C 5/60
[52] U.S. Cl. ........................... 131/281; 219/121 LK; 219/121 LY; 219/121 LS; 219/121 LT; 219/121 LU
[58] Field of Search ................ 131/20 R, 21 R, 27 R, 131/27 A, 15 B, 23 R, 21 R; 219/12 EB, 384, 121 EM, 121 L, 121 LM, 121 LK, 121 LQ, 121 LR, 121 LS, 121 LT, 121 LU, 121 LY

[56] References Cited

U.S. PATENT DOCUMENTS

| | | | |
|---|---|---|---|
| 3,291,136 | 12/1966 | Bayer | 131/15 B |
| 3,419,321 | 12/1968 | Barber et al. | 131/23 R UX |
| 3,808,394 | 4/1974 | Mominee et al. | 131/23 R UX |
| 4,013,261 | 3/1977 | Steigerwald et al. | 131/23 R UX |
| 4,032,743 | 6/1977 | Erbach et al. | 131/23 R UX |

*Primary Examiner*—Vincent Millin
*Attorney, Agent, or Firm*—Peter K. Kontler

[57] ABSTRACT

Webs which are to be converted into wrappers for filter rod sections, cigars, cigarillos or cigarettes, or the wrappers of such articles, are perforated by one or more laser beams in the machine wherein the articles are produced. The permeability of wrappers can be changed by increasing or reducing the number of holes and/or by increasing or reducing the size of holes in each wrapper. The permeability of the wrappers of finished articles is monitored and the intensity of laser beam or beams is automatically adjusted when the monitored permeability deviates from a desired value. The perforations are formed for the purpose of admitting cool atmospheric air which influences the quantity of nicotine and condensate in the column of smoke. The perforations are disposed close to or in the filter plugs of filter cigarettes, cigars or cigarillos, or close to one or both ends of each filter rod section or plain cigarette, depending on the length of such articles.

27 Claims, 12 Drawing Figures

APPARATUS FOR INCREASING THE PERMEABILITY OF WRAPPING MATERIAL FOR ROD-SHAPED SMOKERS PRODUCTS

CROSS-REFERENCE TO RELATED APPLICATION

This is a continuation-in-part of the commonly owned copending application Ser. No. 805,712 filed June 13, 1977 now abandoned which is a continuation-in-part of the commonly owned application Ser. No. 766,927 filed Feb. 9, 1977 now U.S. Pat. No. 4,121,595 for "Apparatus for increasing the permeability of wrapping material for rod-shaped smokers' products".

BACKGROUND OF THE INVENTION

The present invention relates to apparatus for increasing the permeability of wrapping material for rod-shaped smokers' products including tobacco rods, filter rods, filter rod sections and plain or filter tipped cigarettes, cigars and cigarillos. More particularly, the invention relates to apparatus for increasing the permeability of wrappers of such rod-shaped articles in the machine or machines wherein the articles are produced.

It is already known to provide the wrappers of filter cigarettes or like rod-shaped smokers' products with holes or perforations which allow cool atmospheric air to enter the column of tobacco smoke. As a rule, filter tipped smokers' products are perforated in the region of their filter plugs to insure that atmospheric air can enter the column of tobacco smoke irrespective of the length of combusted portion of the tobacco-containing section of the product. The admission of cool atmospheric air into tobacco smoke reduces the harmful effects of smoke because it influences the quantity of nicotine and condensate. It is desirable to regulate the permeability of wrappers of all articles of a given brand in such a way that the permeability is constant or deviates only negligibly from a predetermined value which guarantees maximum beneficial effect of cool atmospheric air upon the column of hot tobacco smoke that flows into the mouth.

Heretofore known proposals to regulate the permeability of wrappers for filter cigarettes or the like include the provision of mechanical perforating devices which puncture the wrappers, for example, during rolling of plain cigarettes and filter plugs to convert such articles into filter cigarettes of unit length or multiple unit length. The perforating devices normally comprise needles whose tips extend into the path of movement of successive wrappers and puncture the wrappers in the region of filter plugs or directly in the filter plugs. The needles are subjected to pronounced wear, especially in a modern high-speed maker which is capable of turning out up to and in excess of 70 articles per second. As the wear upon the needles progresses, the size of each hole increases and the percentage of admitted cool atmospheric air also increases. Therefore, the perforating mechanism must be equipped with adjusting means which compensates for the wear upon the needles. Reference may be had to commonly owned copending patent application Ser. No. 735,166 filed Oct. 26, 1976 now U.S. Pat. No. 4,121,595 by Alfred Hinzmann. Alternatively, the needles must be replaced at frequent intervals which entails lengthy interruptions in operation of the maker.

OBJECTS AND SUMMARY OF THE INVENTION

An object of the invention is to provide a machine for the production and/or processing of rod-shaped smokers' products wherein the permeability of wrappers of such products can be regulated without any wear upon the parts which influence the permeability of wrappers.

Another object of the invention is to provide a machine of the above outlined character wherein the permeability of wrappers can be regulated with a high degree of accuracy and reproducibility, and wherein the provision of permeability regulating means adds little to the bulk of the machine.

A further object of the invention is to provide a novel and improved apparatus which increases the permeability of wrappers of rod-shaped smokers' products and which can be installed in existing machines for the production of filter rod sections or plain or filer tipped cigarettes, cigars or cigarillos.

An additional object of the invention is to provide the apparatus with novel and improved means for perforating the wrappers of rod-shaped smokers' products.

A further object of the invention is to provide one or more annuli of perforations in the wrappers of filter cigarettes or other rod-shaped articles which constitute or form part of smokers' products while the articles move sideways or are about to move sideways.

An ancillary object of the invention is to provide the apparatus with novel and improved means for varying the size of holes in the wrappers of rod-shaped smoker's products.

The invention is embodied in a machine for the production and/or processing of rod-shaped articles which constitute or form part of smokers' products and wherein a wrapper surrounds a filler of fibrous material. The machine may serve for the production of plain cigarettes, cigarillos or cigars, for the production of filter rods which can be subdivided into filer rod sections or filter plugs of desired length, or for the production of filter cigarettes, cigars or cigarillos.

The improved machine comprises drive means (e.g., a pair of advancing rolls, a rotary drum-shaped conveyor or a garniture tape) which moves a succession of wrappers along a predetermined path (such wrappers may constitute successive unit lengths of a continuous web of wrapping material, successive unit lengths of the tubular envelope of a continuous rod of fibrous material, or the tubular envelopes of discrete rod-shaped articles), and at least one perforating unit including at least one laser or another suitable source of coherent radiation (such radiation may constitute a laser beam, an ion beam or an electron beam), which is operable to emit at least one beam of coherent radiation, means for directing the beam against successive wrappers in the aforementioned path whereby the wrappers are perforated at the points of impingement of the beam with attendant increase in permeability, and means for operating the source of radiation in synchronism with the drive means to cause the beam to perforate selected portions of successive wrappers.

If the source of coherent radiation is installed in a machine for the production of plain cigarettes, cigars or cigarillos, in a machine for the production of filter rod sections, or in a machine for the production of filter cigarettes, cigars or cigarillos, the machine comprises means for draping the wrappers around the respective fillers and a source of a web or ribbons of coherent wrappers (such web is thereupon severed to yield a succession of wrappers which may constitute uniting bands for attachment of filter plugs to plain cigarettes, cigarillos or cigars, or the web is severed subsequent to draping around a filter rod or a tobacco rod, i.e., subsequent to conversion into a tubular envelope or wrapper which surrounds a series of coherent fillers). The drive means then comprises means for advancing coherent wrappers from the source of web to the draping means, and the beam directing means is adjacent the path of coherent wrappers intermediate the source of the web and the draping means or adjacent the path of the continuous rod which is obtained upon draping of the web around the filler.

In either embodiment, the operating means preferably includes means for operating the radiation source a predetermined number of times per unit length of the web whereby each such unit length equals the length of a wrapper.

If the moving means comprises a conveyor which moves successive rod-shaped articles sideways, the conveyor preferably supports first portions of successive articles and leaves second portions of such articles unsupported. The beam directing means then preferably directs the beam or beams against the unsupported second portions of successive articles.

The machine preferably further comprises means (e.g., a variable resistor) for adjusting the intensity of the beam at the points of impingement to thus determine the size of perforations in the wrappers, and means for monitoring the permeability of wrappers downstream of the points of impingement as well as means (e.g., a servomotor) for actuating the adjusting means when the monitored permeability of wrappers deviates from a predetermined value.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
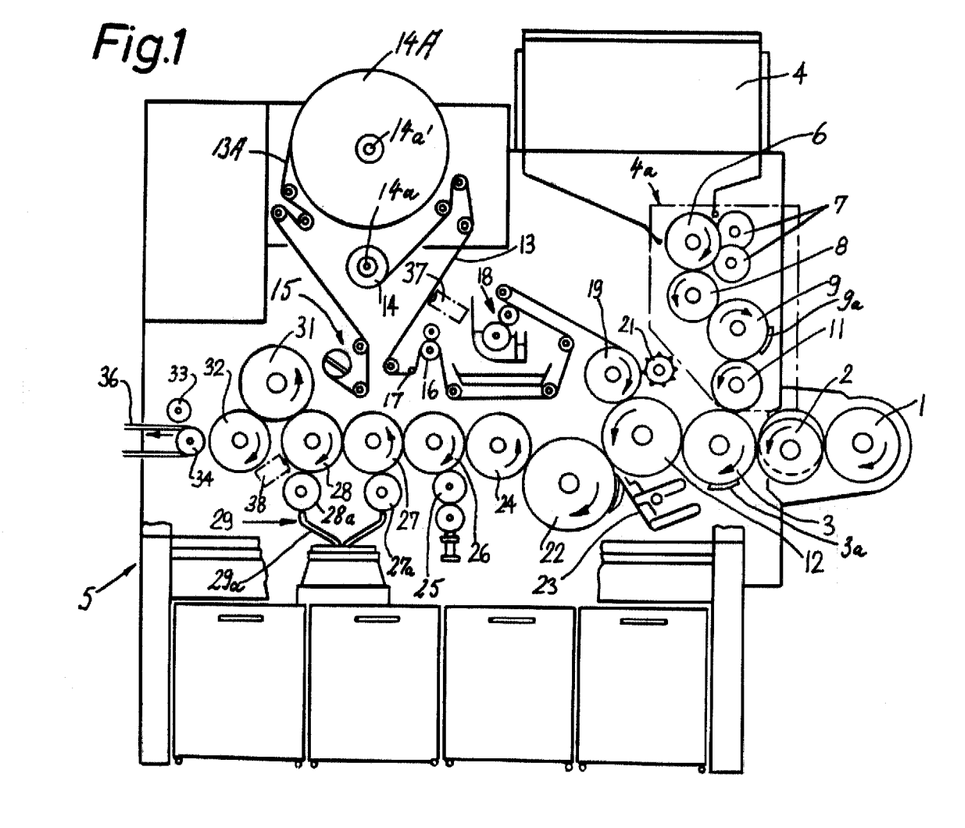
FIG. 1 is a schematic elevational view of a filter cigarette making machine which embodies the invention.

FIG. 1 shows a filter cigarette making machine of the type known as MAX-S produced by Hauni-Werke Körber & Co. KG., of Hamburg, Federal Republic Germany. The machine of FIG. 1 is directly coupled to a machine which produces plain cigarettes of unit length, e.g., a machine of the type shown in FIG. 7. The cigarette making machine delivers plain cigarettes of unit length into successive flutes of a rotary drum-shaped row forming conveyor 1 wherein the cigarettes form two rows. The cigarettes of one row are received in the oddly numbered flutes and are adjacent one axial end, and the cigarettes of the other row are received in evenly numbered flutes and are adjacent the other axial end of the conveyor 1. The conveyor 1 delivers the two rows of cigarettes to two discrete rotary drum-shaped aligning conveyors 2 which are mounted in the frame 5 of the filter cigarette making machine and rotate at different speeds and/or transport the cigarettes of the respective rows through different distances so that each cigarette of one row is invariably aligned with a cigarette of the other row before the thus aligned cigarettes reach the transfer station between the conveyors 2 and a rotary drum-shaped assembly conveyor 3. The assembly conveyor 3 has flutes each of which receives a pair of spaced-apart plain cigarettes of unit length, and the width of the gap between the cigarettes of each pair at least equals but preferably exceeds the length of a filter rod section or filter plug of double unit length.

The upper portion of the frame 5 supports a magazine or hopper 4 for filter rod sections of six times unit length. The outlet 4a of the magazine 4 is adjacent a rotary drum-shaped severing conveyor 6 having flutes which receive discrete filter rod sections of six times unit length and transport such sections past two rotary disk-shaped knives 7. Each filter rod section of six times unit length is severed twice to yield a group of three coaxial filter rod sections or filter plugs of double unit length. The filter plugs of each group are delivered to the flutes of three discrete rotary drum-shaped staggering conveyors 8 (only one shown in FIG. 1) which rotate at different speeds and/or transport the respective filter plugs through different distances so that the filter plugs of each group are staggered with respect to each other, as considered in the circumferential direction of the illustrated staggering conveyor 8, and these conveyors deliver the staggered filter plugs into successive flutes of a rotary drum-shaped shuffling conveyor 9 which cooperates with one or more stationary cams 9a to shift at least two filter plugs of each group axially into exact alignment with each other, i.e., the filter plugs which advance beyond the cams 9a form a single row wherein each preceding filter plug is in exact register with the next-following filter plug. The filter plugs of the thus obtained row are transferred into successive flutes of a rotary drum-shaped accelerating conveyor 11 which inserts successive filter plugs into successive flutes of the assembly conveyor 3 so that each filter plug enters the space corresponding to the gap between two aligned plain cigarettes of unit length. Thus, once a flute of the assembly conveyor 3 advances beyond the transfer station between the conveyors 2 and the conveyor 3, each such flute contains a group of three coaxial rod-shaped articles including two plain cigarettes of unit length and a filter rod section or filter plug of double unit length therebetween. These groups are caused to pass between two stationary cams 3a which move the plain cigarettes of each group axially toward and into abutment with the respective filter plug before the thus condensed groups are transferred into successive flutes of a rotary drum-shaped transfer conveyor 12.

The frame 5 further supports a spindle 14a for a source (reel 14) of convoluted web 13 of cigarette paper, imitation cork or other suitable wrapping material. The web 13 is trained over several guide rolls and around a curling device 17, preferably of the type disclosed in commonly owned U.S. Pat. No. 3,962,957 to Hinzmann. The web 13 thereupon passes through the nip of two advancing rolls 16 which constitute a drive means and at least one of which is driven by the prime mover of the machine. The other advancing roll 16 is biased against the one roll to move the web 13 lengthwise toward and beyond a paster 18 which coats one side of the web with a suitable adhesive. The leader of the web 13 adheres to and is advanced by a rotary suction drum 19 which cooperates with a rotary knife 21 to sever the leader at regular intervals so that the web 13 yields a succession of adhesive-coated uniting bands. Successive uniting bands are applied to successive groups of rod-shaped articles in the flutes of the transfer conveyor 12 in such a way that each uniting band adheres to the corresponding filter plug and to the inner end portions of the aligned plain cigarettes of unit length, and that the major portion of the uniting band extends substantially tangentially of the respective group. Such groups, each of which carries a uniting band, are transferred onto a rotary drum-shaped wrapping or draping conveyor 22 which cooperates with a stationary or mobile rolling or draping device 23 to roll successive groups of rod-shaped articles about their respective axes and to thus convert each such group into a filter cigarette of double unit length wherein the uniting band forms a tube draped around the corresponding filter plug and the adjacent inner end portions of the associated plain cigarettes of unit length.

The filter cigarettes of double unit length are thereupon transferred onto a rotary drum-shaped drying conveyor 24 which promotes the setting of adhesive at the inner sides of the tubes and delivers the filter cigarettes of double unit length into successive flutes of a rotary drum-shaped severing conveyor 26 cooperating with a rotary disk-shaped knife 25 to sever each filter cigarette of double unit length midway between its ends so that each such cigarette yields two coaxial filter cigarettes Z (see FIG. 2) of unit length (hereinafter called filter cigarettes for short). The filter plugs (of unit length) of each pair of aligned filter cigarettes Z are adjacent each other. In order to invert one filter cigarette Z of each pair, the severing conveyor 26 delivers successive pairs of aligned filter cigarettes into the flutes of a rotary drum-shaped conveyor 27 forming part of a turn-around device 29 of the type disclosed in commonly owned U.S. Pat. No. 3,583,546 to Koop. The conveyor 27 delivers one filter cigarette Z of each pair to a conveyor 28 and the other filter cigarette of each pair to a conveyor 27a. The conveyor 27a delivers successive filter cigarettes to successive orbiting inverting arms 29a which change the orientation of filter cigarettes by 180 degrees and deliver them to the flutes of a rotary drum-shaped conveyor 28a. The conveyor 27 delivers non-inverted filter cigarettes into alternate flutes of the conveyor 28, and the conveyor 28a delivers inverted filter cigarettes into the other flutes of the conveyor 28 so that the latter carries a single row of filter cigarettes wherein all filter plugs face in the same direction. All rotary drum-shaped conveyors of the machine shown in FIG. 1 transport the respective rod-shaped articles sideways.

The conveyor 28 delivers the single row of filter cigarettes Z to a rotary drum-shaped testing conveyor 31 whereon the cigarettes are tested for the quality of their wrappers (presence or absence of open seams, holes or analogous defects). The conveyor 31 delivers filter cigarettes to a rotary drum-shaped conveyor 32 which is equipped with or cooperates with ejector means for segregating defective filter cigarettes from satisfactory filter cigarettes. Satisfactory filter cigarettes are transferred onto the upper reach of a belt conveyor 36 which is trained over pulleys 34 (one shown in FIG. 1) and delivers such cigarettes to storage, to a tray filling machine or directly to a packing machine, not shown. The illustrated pulley 34 for the belt conveyor 36 cooperates with a braking drum 33 for filter cigarettes.

A second spindle 14a' in the frame 5 supports a reel 14A of fresh web 13A. The leader of the fresh web 13A is held at a splicing station 15 which comprises means for attaching the leader of the web 13A to the running web 13 when the supply of web 13 is nearly exhausted. The exact nature of the mechanism at the splicing station 15 forms no part of the present invention.

The filter cigarette making machine of FIG. 1 further comprises means for providing the wrappers of filter cigarettes Z with perforations. Such perforating means may include a first perforating unit 37 having a laser or an analogous source of coherent radiation, which is adjacent the path of the web 13 intermediate the reel 14 and curling device 17 and/or a second perforating unit 38 which is adjacent the path of finished or partly finished articles, e.g., adjacent the conveyor 28 of the turn-around device 29. It will be recalled that the filter cigarettes Z in the flutes of the conveyor 28 travel sideways.

Figure 2:
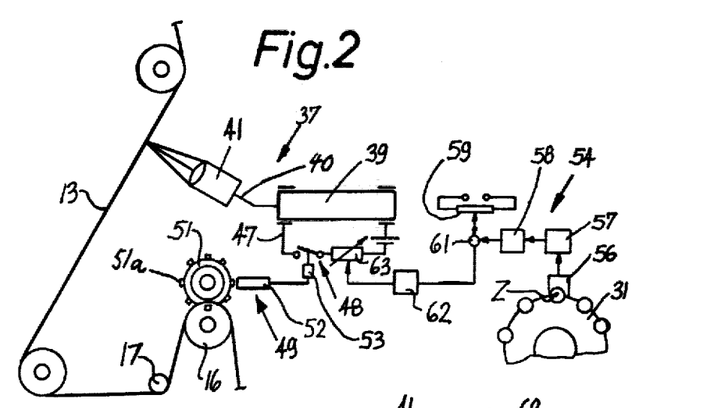
FIG. 2 is an enlarged view of a detail in FIG. 1, showing a web perforating unit which is constructed and assembled in accordance with the invention disclosed in the copending application Ser. No. 766,927.

FIG. 2 shows the details of the perforating unit 37. The unit 37 comprises a suitable source 39 (e.g., a resonator) which furnishes a laser beam 40. The beam 40 is directed toward a device 41 which splits the beam into two discrete beams 40a, 40b (see FIG. 3) and focuses the beams upon the running web 13 which is thereby provided with perforations or holes 55 shown in FIG. 4. The device 41 comprises a partially light-transmitting mirror 42 which allows the beam 40a to pass and deflects the beam 40b against the reflecting surface of a mirror 44. The mirrors 42, 44 respectively direct the beams 40a, 40b against optical elements 43, 46 which focus the respective beams upon the adjacent surface of the running web 13. The intensity of the beam 40a may but need not equal the intensity of the beam 40b, i.e., the mirror 42 can reflect more or less than one-half of the original beam 40.

The reference character 47 denotes conductor means which supplies energy to the source 39. Such conductor means contains a switch 48 which constitutes an impulse generator. The means for operating the source 39 in synchronism with the advancing rolls 16 for the web 13 includes a control device 49 which comprises a pulse generator composed of a disk 51 driven in synchronism with the advancing rolls 16 for the web 13 and having projections 51a travelling past a proximity switch 52 which furnishes a pulse when approached by a projection 51a. The switch 52 then causes a servomotor 53 to close the switch 48 in the conductor means 47. In this manner, the perforating unit 37 provides the web 13 with two rows of holes 55 (see FIG. 4). If desired, the device 41 of FIG. 3 can be replaced with a device which splits the beam 40 into three or more discrete beams so that the web 13 is formed with three or more rows of holes. The material of the wrappers of filter plugs and plain cigarettes is porous so that the provision of holes 55 in the web 13 (which is converted into uniting bands) increases the permeability of the wrapper of each filter cigarette Z of unit length in the region of the respective filter plug.

FIG. 2 further shows means for automatically adjusting the perforating unit 37 in response to monitoring of the permeability of wrappers on filter cigarettes Z of unit length. The testing conveyor 31 forms part of a testing apparatus 54 which further includes an electropneumatic transducer 57 serving to furnish electric signals which are indicative of permeability of the wrappers of successive filter cigarettes Z of unit length. The transducer 57 preferably comprises a membrane whose position varies in response to passage of a testing fluid through the wrapper of the cigarette Z at the testing station, and the position of the membrane is monitored by a capacitor. Reference may be had to commonly owned U.S. Pat. No. 3,412,856 to Esenwein. The transducer 57 receives pneumatic signals from a testing chamber 56 which is installed at the testing station, and the output of the transducer 57 transmits signals to an integrating circuit 58 which transmits signals to a signal comparing stage 61. The stage 61 has a second input which is connected with a source 59 of reference signals (e.g., an adjustable potentiometer). When the intensity of signal from the circuit 58 deviates from the intensity of signal from the source 59, the output of the stage 61 transmits a signal to a servomotor 62 which adjusts a variable resistor 63 in circuit with the switch 48 and energy source for the source 39 of coherent radiation. The arrangement is preferably such that the circuit 58 transmits a signal in response to reception of a plurality of signals from the transducer 57. The integrated signal which is transmitted from the circuit 58 to the stage 61 is indicative of average permeability of several filter cigarettes Z, and the servomotor 62 adjusts the resistor 63 if the intensity of such integrated signal deviates from the intensity of the reference signal. The resistor 63 determines the quantity of energy which is supplied to the source 39 and hence the intensity of radiation (beam 40). Such intensity determines the diameters of holes 55 which are formed in the running web 13. The primary purpose of adjusting means 63 for the laser 39 is to insure that the permeability of the wrappers of cigarettes Z does not decrease or remain below a predetermined minimum value.

Figure 3:
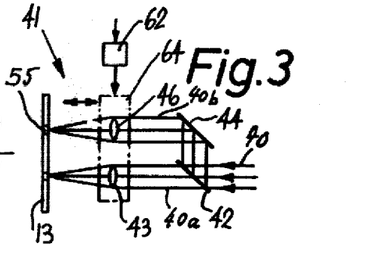
FIG. 3 is an enlarged view of a beam splitting device in the unit of FIG. 2.
Figure 4:
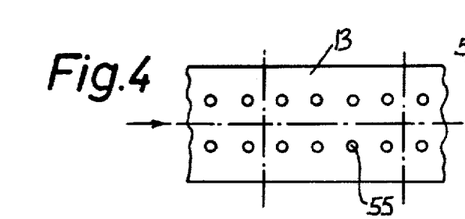
FIG. 4 is a fragmentary plan view of a portion of the web with perforations which are formed by the unit of FIG. 2.

FIG. 3 further shows a slight modification of the adjusting means. The servomotor 62 is connected with a carriage or another mobile support 64 for the optical elements 43 and 46. When the servomotor 62 receives a signal from the output of the signal comparing stage 61, it causes the carriage 64 to move toward or away from the path of the running web 13 to thereby change the size of holes 55 by shifting the focal plane of the optical elements. The directions in which the carriage 64 can be shifted by the servomotor 62 are indicated by a double-headed arrow.

It is further clear that the control device 49 can be modified to operate the source 39 in a different way. For example, the switch 48 can be replaced with a mask which has apertures for the beams 40a, 40b and is movable transversely of the path of such beams to place the apertures into register with the beams at intervals determined by the pulse generator 51, 52. Furthermore, the source 39 can be installed in the interior of a perforated drum or roller over which the web 13 is trained and which determines the size of holes 55 as well as the number and distribution of such holes in the running web. Still further, the unit 37 may comprise means for varying the number of holes in successive unit lengths (uniting bands) of the web 13 for the purpose of regulating the porosity of wrappers of the respective cigarettes Z.

Figure 5:
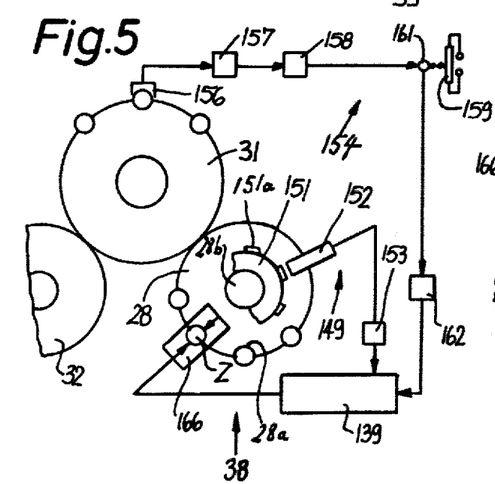
FIG. 5 is an enlarged view of a second detail in FIG. 1, showing a modified perforating unit which can be used in the machine of FIG. 1 to form perforations in the filter plugs of filter cigarettes.
Figure 6:
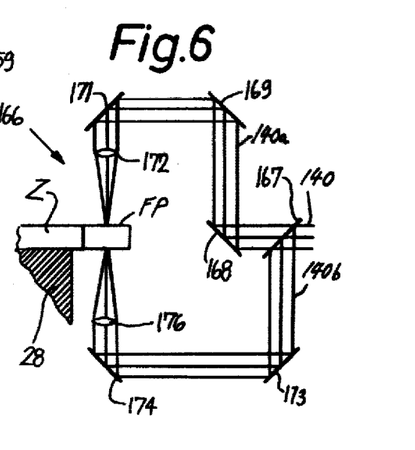
FIG. 6 is an enlarged view of a beam splitting device in the unit of FIG. 5.

FIG. 5 illustrates the details of the perforating unit 38 of FIG. 1. This unit includes a source 139 of coherent radiation which is a laser, and a beam splitting device 166 the details of which are shown in FIG. 6. The device 166 comprises a partially light-transmitting mirror 167 which divides the incoming beam 140 into beams 140a, 140b. The beam 140a is reflected by mirrors 168, 169, 171 and is focused on the filter plugs FP of successive filter cigarettes Z by an optical system 172. The beam 140b is reflected by mirrors 173, 174 and is focused on the filter plugs FP by an optical system 176. FIG. 6 further shows that the conveyor 28 supports the cigarettes Z in such a way that a first portion of each cigarette is supported in the respective flute 28a (FIG. 5) but a second portion (including the filter plug FP) remains unsupported. The beams 140a, 140b impinge upon diametrically opposite sides of successive filter plugs FP.

The pulse generator of the control unit 149 which operates the source 139 in synchronism with the drive means (conveyor 28) for the filter cigarettes Z include a disk 151 on the shaft 28b of the conveyor 28, projections 151a at the periphery of the disk 151, a proximity switch 152 which transmits signals when approached by successive projections 151a, and a servomotor 153 for the impulse generator (not shown) in the circuit of energy source for the laser 139.

The means for monitoring the permeability of filter cigarettes Z downstream of the conveyor 28 is analogous to the monitoring means of FIG. 2 and its component parts are denoted by similar reference characters plus 100. The adjusting means including the servomotor 162 receives a positive or negative signal whenever the intensity of signal from the integrating circuit 158 to the signal comparing stage 161 deviates from intensity of reference signal which is furnished by the source 159. The servomotor 162 then effects a change in the intensity of coherent beam 140 to increase or reduce the size of perforations which are formed by the beams 140a, 140b.

The device 166 can be modified to split the beam 140 into three or more beams so that each filter plug FP is formed with more than two perforations.

Furthermore, the perforating unit 38 can be installed adjacent a portion of the path wherein the filter cigarettes Z move sideways and simultaneously rotate about their respective axes so that each of the beams 140a, 140b forms an elongated slotshaped hole. Also, the beams 140a, 140b can be directed against successive articles Z while the articles are at a standstill or while the articles do not move sideways or axially but rotate about their respective axes. For example, the unit 38 can be installed adjacent the gap between the belt 36 and the braking drum 33.

Figure 7:
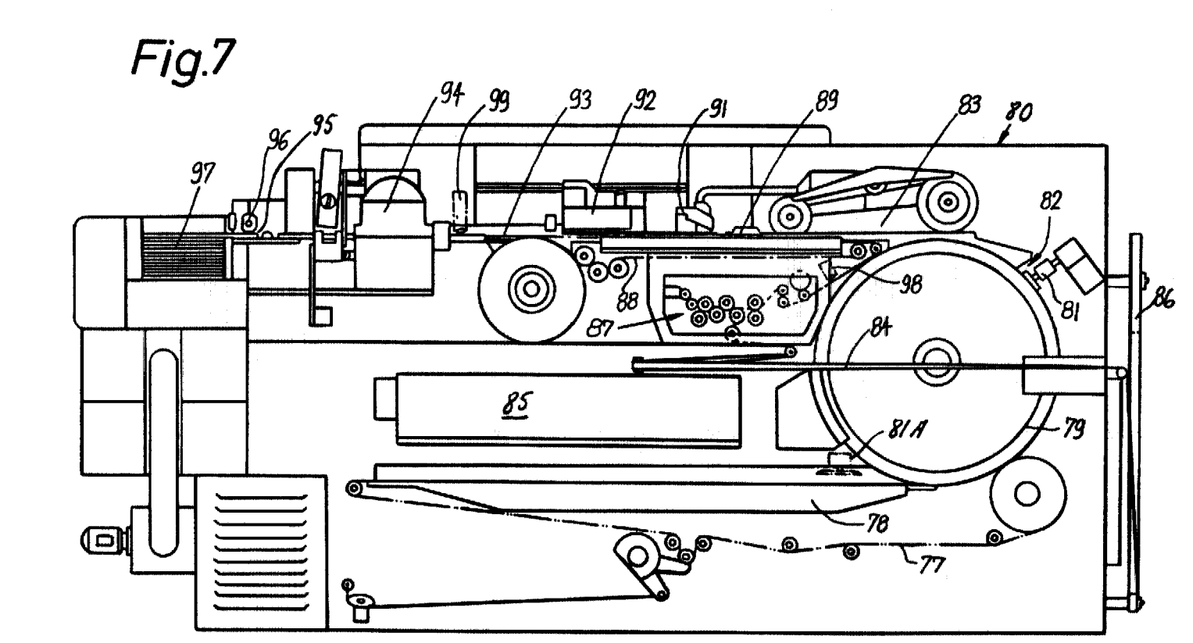
FIG. 7 is a schematic elevational view of a cigarette making machine which embodies the invention disclosed in Ser. No. 766,927.

FIG. 7 illustrates a machine, known as GARANT (trademark) manufactured by Hauni-Werke Körber & Co. KG., Hamburg, Federal Republic of Germany, which produces plain cigarettes 95 of unit length. The machine comprises a frame 80 which supports a distributor 85 serving to shower the leading edge of a wide sliver of tobacco shreds onto the upper reach of an endless tobacco stream forming belt conveyor 77. The upper reach of the conveyor 77 travels above the perforated top wall of a suction chamber 78 which attracts the shreds and causes them to form a growing tobacco stream which advances in a direction to the right, as viewed in FIG. 7. The upper side of the fully grown tobacco stream can be trimmed by a first equalizing device 81A (indicated by phantom lines) before the stream enters the circumferential groove of a rotary suction wheel 79. The bottom wall of the groove in the periphery of the wheel 79 surrounds a suction chamber which attracts the once-trimmed stream during transport past a second equalizing device 81 which trims the other side of the stream and converts it into a rod-like filler 82 which is removed from the wheel 79 by a pneumatic transfer conveyor 83 and delivered onto a continuous web 84 of cigarette paper. A web 84 is withdrawn from a reel 86 by a pair of advancing rolls (not shown) and passes through an imprinting mechanism 87 which provides spaced-apart portions of the web with indicia representing the trademark of the manufacturer, the name of the manufacturer, the brand name of the cigarettes and/or other information. The web 84 thereupon advances toward and is entrained by the upper reach of an endless band conveyor 88 known as garniture. The latter transports the web 84 and the filler 82 through a wrapping mechanism 89 which drapes the web around the filler in such a way that one marginal portion of the web extends tangentially of the filler and can be coated with adhesive during travel along a suitable paster 91. The thus coated marginal portion is then folded over the other marginal portion of the web 84 to form therewith the longitudinally extending seam of the resulting tubular wrapper forming part of a continuous cigarette rod 93. The seam is heated or cooled by a sealer 92, depending upon whether the adhesive which is applied by the paster 91 is a wet adhesive or a hotmelt. The rod 93 is severed at regular intervals by a cutoff 94 so that it yields a single file of plain cigarettes 95 of unit length which are accelerated by a rapidly rotating cam 96 so as to enter successive flutes of a rotary drum-shaped row forming conveyor 97 corresponding to the conveyor 1 of FIG. 1.

The machine of FIG. 7 further comprises a perforating unit 98 including a laser which is adjacent the path of movement of the web 84 between the imprinting mechanism 87 and the right-hand end turn of the garniture 88 and/or a perforating unit 99 which is adjacent the path for the cigarette rod 93 between the sealer 92 and the cutoff 94.

Figures 8, 9, 10:
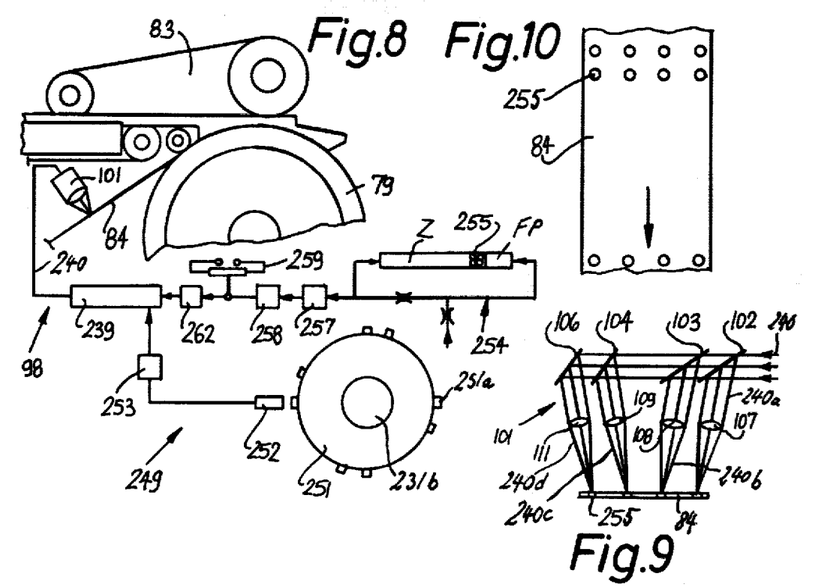
FIG. 8 is an enlarged view of a detail in the machine of FIG. 7, showing a perforating unit which can perforate a continuous web of cigarette paper.
FIG. 9 is an enlarged view of a beam splitting device in the unit of FIG. 8.
FIG. 10 is a plan view of a portion of the web which is perforated by the unit of FIG. 8.

The perforating unit 98 is shown in detail in FIGS. 8 and 9. This unit is adjacent the path of coherent wrappers, i.e., to the path of the web 84 prior to subdivision of this web into discrete wrappers of plain cigarettes 95. All such parts of the perforating unit 98 which are identical with or clearly analogous to those shown in FIGS. 2 and 3 are denoted by similar reference characters plus 200. The unit 98 comprises a source 239 of coherent radiation (preferably a laser) and a beam splitting device 101 which comprises three partially light-transmitting mirrors 102, 103, 104 and a reflecting mirror 106. Beams 240a, 240b, 240c, 240d which are respectively reflected by mirrors 102, 103, 104, 106 are focused upon the running web 84 by optical systems 107, 108, 109, 111 so that the unit 98 provides longitudinally spaced portions of the web 84 with transversely extending rows of four perforations or holes 255 each (see FIG. 10). The light-transmissivity of mirrors 102, 103, 104 is selected in such a way that the intensity of each of the beams 140a–140d is preferably (but not necessarily) the same.

The control means 249 for operating the laser 239 at such intervals that each unit length of the web 84 is provided with a predetermined number of perforations or holes 255 includes a timer disk 251 having projections 251a and receiving torque from a drive 231b, e.g., the shaft for one of the conveyors shown in FIG. 7. The projections 251a travel past a proximity switch 252 which transmits signals to a servomotor 253 for an impulse generator (not shown) in the same way as described in connection with FIG. 2. The distribution of projections 251a on the disk 251 is such that each unit length of the web 84 is formed with two rows of perforations 255 close to one end of such unit length (each unit length corresponds to the length of a plain cigarette 95) so that the perforations are adjacent to that end of a filter cigarette Z (see FIG. 8) which is disposed next to the corresponding filter plug FP. This can be readily achieved by arranging the projections 251a in pairs so that the circuit of the laser 239 is completed twice in rapid sequence and thereupon remains open for a longer interval of time.

The monitoring and adjusting means of FIG. 8 are identical with those shown in FIG. 2. Thus, the monitoring means 254 monitors the permeability of wrappers of filter cigarettes Z (the plain cigarettes 95 which are produced in the machine of FIG. 7 are assumed to be fed into the machine of FIG. 1) so that a single testing unit suffices to detect defective articles Z as well as to cause the adjusting means (including the servomotor 262 of FIG. 8) to adjust the intensity of the beam 240 whenever the monitored permeability of a series of satisfactory articles Z (see the integrating circuit 258) deviates from a predetermined value selected by the setting of the potentiometer 259.

Figure 11:
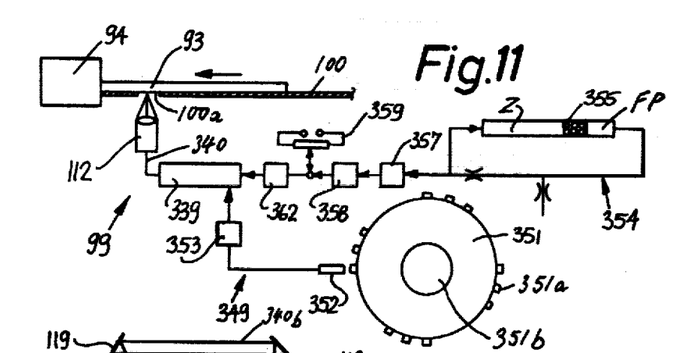
FIG. 11 is a fragmentary partly sectional view of a second detail in the machine of FIG. 7, showing another perforating unit which can form perforations in the tubular envelope of a continuous cigarette rod.
Figure 12:
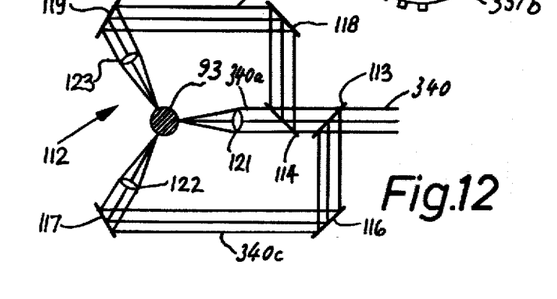
FIG. 12 is an enlarged view of a beam splitting device in the unit of FIG. 11.

The perforating unit 99 of FIG. 7 is shown in detail in FIGS. 11 and 12. This unit is adjacent the path of coherent wrappers, i.e., it is located upstream of the cutoff 94 which subdivides the continuous wrapper or envelope and the continuous filler 82 of the cigarette rod 93 into discrete plain cigarettes 95. All such parts of this unit which are identical with or clearly analogous to the corresponding parts of the unit 37 are denoted by similar reference characters plus 300. The guide 100 for the rod 93 has a cutout 100a which is in register with a beam splitting device 112 of the unit 99. The beam 340 which issues from the laser 339 is split into three discrete beams 340a, 340b, 340c by the mirrors 113, 114, 118, 119, 116, 117 of FIG. 12, and the beams 140a, 140b, 140c are respectively focused by optical systems 121, 123, 122 to impinge upon the continuous tubular wrapper or envelope of the rod 93 so as to form therein groups of three rows of perforations 355 whereby each row comprises three perforations. The shaft 351b of the disk 351 for projections 351a receives torque from the main prime mover of the machine of FIG. 7; for example, the shaft 351b can drive one of the pulleys for the garniture 88. This insures that the operation of the laser 339 is synchronized with movement of the rod 93 through the cigarette making machine.

The projections 351a are disposed in groups of three so that the laser 339 receives three successive impulses at short intervals and is thereupon idle for a longer interval. This insures that each unit length of the envelope of the rod 93 is provided with three rows of perforations 355 close to one axial end of such unit length. Each unit length of the rod 93 corresponds to the length of a plain cigarette 95.

It is clear that the perforating unit 98 and/or 99 can be used with equal advantage in a filter rod making machine wherein a tow of filamentary filter material or another filler which intercepts deleterious ingredients of tobacco smoke is draped into a web of cigarette paper, imitation cork or the like. The same applies for the perforating unit 37 and/or 38. Thus, wrappers of filter rod sections can be perforated by resorting to beams of coherent radiation prior to draping of the web about the filler, subsequent to draping (i.e., while the web and the filler form a continuous rod) or subsequent to subdivision of the rod into discrete rod-shaped articles.

The adjusting rod and monitoring means of FIG. 11 are analogous to those shown in FIG. 8. The monitoring means 354 operates with compressed air and the servomotor 362 of the adjusting means is actuated to change the intensity of the beam 340 when the intensity of the reference signal (potentiometer 359) deviates from intensity of signal at the output of the integrating circuit 358.

An important advantage of the apparatus of FIGS. 1 to 12 is that the wear upon the means for forming holes in the wrappers of rod-shaped smokers' products is non-existent or negligible because the perforating units do not have any mechanical parts which come into physical contact with the articles. Furthermore, and since the perforating units are installed directly in the respective machines, the webs or wrappers can be perforated in a manner and to an extent which is desired for the particular type of articles produced. Still further, the perforating units can be adjusted with a high degree of accuracy and reproducibility to thus insure that the permeability of each and every wrapper matches or closely approximates an optimum value. The adjustment can be effected by varying the size and/or distribution of holes in the wrappers. Moreover, the perforating units can be readily adjusted or modified to perforate selected portions of wrappers.

The laser or lasers which are used in the machines of the present invention are preferably $CO_2$ lasers. The diameters of the holes in the webs or wrappers may be in the range of 0.1-0.4 millimeter. When the holes are made directly in the filter plugs, the porosity of the wrappers of filter plugs and/or cigarette paper is of no consequence because the laser beams can burn holes through the uniting bands as well as through the filter plug wrappers. Analogously, the material of cigarette paper need not be porous when the laser beams make holes in the web 84.

Figure 13:
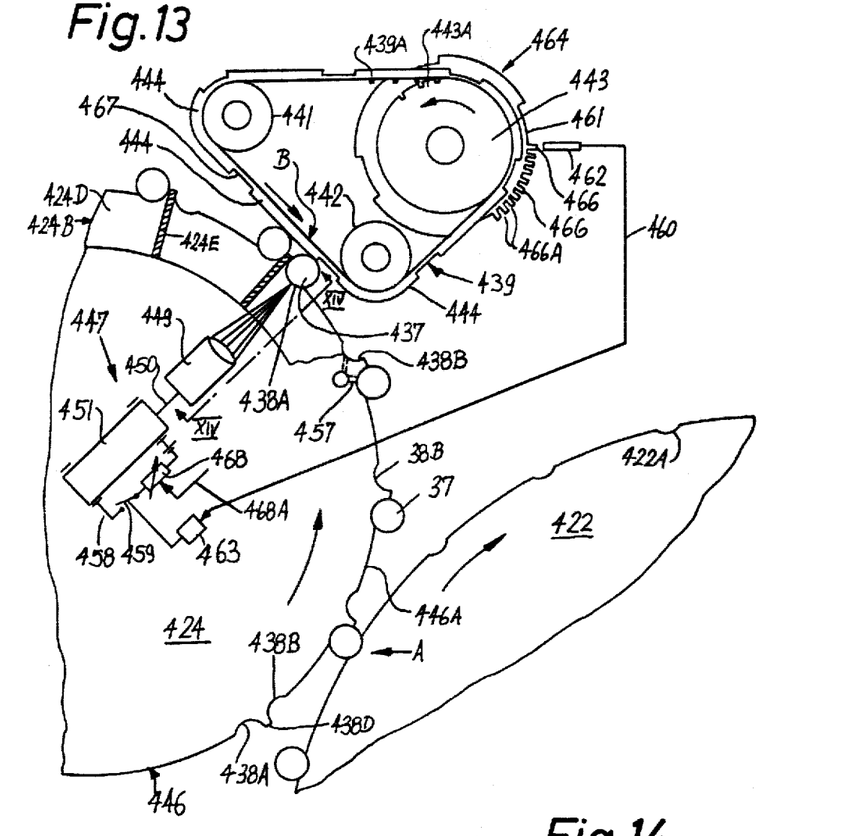
FIG. 13 is a fragmentary elevational view of a filter cigarette making machine which including a web perforating unit embodying one form of the present invention and means for moving successive filter cigarettes to and from a perforating station and for rotating the cigarettes about their axes at the perforating station.

FIG. 13 shows the wrapping conveyor 422 and the hollow drying conveyor 424 of a filter cigarette making machine which is otherwise similar to or identical with the machine of FIG. 1. The conveyor 424 is driven by the main prime mover of the machine to rotate in a counterclockwise direction and its peripheral surface 446 has pairs of receiving means or flutes 438A, 438B for filter cigarettes 437 of double unit length. The flutes 438A, 438B of each pair are separated from each other by a web 438D which is parallel with the axis of the conveyor 424. The surface 446 has arcuate (convex) sections 446A each of which extends from the flute 438A of the preceding pair to the flute 438B of the next following pair of flutes. The flutes 438A of successive pairs receive filter cigarettes 437 from successive flutes 422A of the wrapping conveyor 422 at a transfer station A. Each flute 438A, 438B has one or more suction ports 457 which are in communication with the intake of a suction generating device (e.g., a fan, not shown) during certain stages of each revolution of the conveyor 424. The suction ports 457 of successive flutes 438A must communicate with the intake of the suction generating device between the station A and a locus B where the respective cigarettes 437 are caused to leave the flutes 438A and to rotate about their own axes. Successive flutes 438B must be in communication with the intake of the suction generating device during travel from the locus B to the transfer station between the conveyor 424 and the next conveyor (see the severing conveyor 26 of FIG. 1).

The means for temporarily interrupting the sidewise movement of filter cigarettes 437 of double unit length along the path defined by the conveyor 424 and for simultaneously causing the temporarily arrested cigarettes to rotate about their axes at the locus B includes an endless conveyor 439 which consists of three parallel endless belt conveyors or bands 439a, 439b and 439c (see FIG. 14) trained over idler pulleys 441, 442 and a driven pulley 443 receiving torque from the main prime mover of the filter cigarette making machine. The outer side of each belt has raised portions 444 alternating with recessed portions 467. The length of each raised portion 444 equals the length of a surface section 446A. The inner sides of the belts 439a-439c have teeth 439A mating with the teeth 443A of the driven pulley 443 to insure that each recessed portion 467 of the belt 439a always registers with a recessed portion of each of the belts 439b, 439c.

Those reaches of the belts 439a–439c which extend between the idler pulleys 441, 442 are adjacent the locus B opposite the conveyor 424 and their raised portions 444 are sufficiently close the peripheral surface 446 to engage the wrappers of successive cigarettes 437 in the respective flutes 438A and to expel such articles from their flutes. The speed of lengthwise movement of the belts 439a–439c is identical with the peripheral speed of the conveyor 424; however, the belt portions or reaches between the idler pulleys 441, 442 travel counter to the direction of movement of the peripheral surface 446. Consequently, a cigarette 437 which reaches the locus B begins to rotate about its own axis (clockwise as viewed in FIG. 13) and remains at the locus B as long as it continues to engage with the adjacent raised portions 444 of the belts 439a–439c. The trailing edges of such raised portions advance beyond the locus B simultaneously with arrival of the oncoming empty flute 438B whose port or ports 457 then communicate with the intake of the suction generating device. The flute 438B attracts and moves the respective cigarette 437 beyond the locus B toward the transfer station between the conveyor 424 and the next-following conveyor (26) of the filter cigarette making machine.

The next cigarette 437 (in the oncoming flute 438A) reaches the locus B practically immediately after entry of the preceding cigarette into the respective flute 438B. Such next cigarette is then rotated by the next raised portions 444 of the belts 439a–439c in cooperation with the respective surface section 446A.

Figure 14:
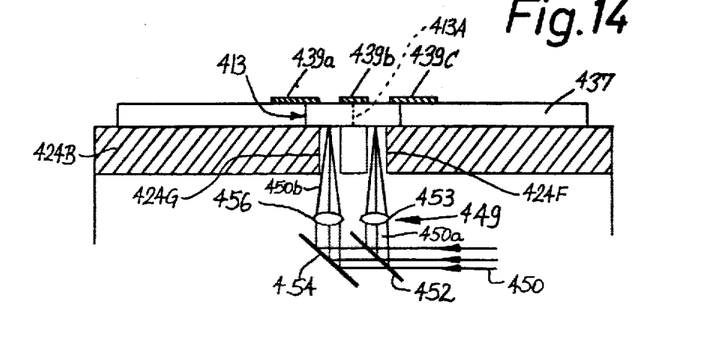
FIG. 14 is a sectional view as seen in the direction of arrows from the line XIV-XIV of FIG. 13.

The cylindrical shell 424B of the conveyor 424 has a circumferential slot 424D (FIG. 13) which is in line with the filter plugs 413 (of double unit length) of the filter cigarettes 437 on the conveyor 424. The slot 424D is interrupted by connecting ribs 424E which register with the webs 438D. Alternatively, the cylinder 424B can be provided with two annuli of discrete slots 424F, 424G (FIG. 14). The slots 424F are disposed between the belts 439b, 439c and the slots 424G are disposed between the belts 439a, 439b. The filter plugs 413 of successive cigarettes 437 extend transversely across the spaces between the belts 439a–439c.

The perforating unit 447 of FIGS. 13 and 14 is installed in the interior of the conveyor 424 and includes a source 451 of coherent radiation (preferably a laser) which emits a beam 450, and a beam splitter 449 including a partially light transmitting mirror 452 and a fully reflecting mirror 454. The mirror 452 divides the beam 450 into two discrete beams 450a, 450b and directs the beam 450a against an optical system 453 which focuses the beam 450a upon the wrapper of the filter plug 413 forming part of the cigarette 437 which rotates at the locus B. The mirror 454 directs the beam 450b against a second optical system 456 which focuses the beam 450b upon the same wrapper. The beams 450a, 450b respectively pass through the then registering slots 424F, 424G of the cylinder 424B. The beams 450a, 450b make holes in two spaced-apart portions of the wrapper of the filter plug 413 forming part of the cigarette 437 which rotates at the locus B. Such portions are located at the opposite sides of the plane 413A (shown in FIG. 14 by broken lines) in which the cigarette 437 is severed by the knife 25 of FIG. 1 to yield two discrete filter cigarettes of unit length.

The means for causing the laser beams 450a, 450b to form two annuli of discrete holes or perforations in the wrapper of each filter plug 413 comprises a plug generator including a disk 464 which is driven by the prime mover of the filter cigarette making machine in synchronism with the conveyors 424, 439 and has several sets of tooth-shaped projections 466 separated by toothless gaps 461. Each set comprises ten projections 466. Such projections travel past a promixity switch 462 which transmits signals via conductor 460 on to a servomotor 463 for a switch 459 in the circuit 458 of the source 451. The circuit 458 is completed (i.e., the beams 450a, 450b impinge upon the wrapper of the filter plug 413 at the locus B) in response to movement of successive projections 466 of a set past the switch 462. The source 451 is quiescent during the short intervals of travel of tooth spaces 466A past the switch 462 (this insures that each of the beams 450a, 450b produces ten discrete holes in each wrapper) and during the longer intervals of travel of toothless gaps 461 past the switch 462 (this insures that the source 451 does not emit the beam 450 during the interval when successive fresh cigarettes 437 in flutes 438A advance toward the locus B).

The circuit 458 comprises a variable resistor 468 which is adjustable in response to signals (arrow 468A) transmitted by a testing device (not shown in FIGS. 13–14) which monitors the permeability of perforated wrappers of successive discrete filter cigarettes and changes the intensity of the beam 450 (and hence the diameters of holes in the wrappers of filter rod sections 413) when the monitored permeability deviates from a desired optimum permeability. Reference may be had to the description of FIG. 2; the servomotor 62 of FIG. 2 can be used to adjust the resistor 468 in the circuit 458 of FIG. 13.

The number of holes in each annulus of holes in the wrappers of successive filter plugs can be increased or reduced by replacing the disk 464 with a disk having projections 466 forming sets each containing n projections wherein n is the desired number of holes in each annulus.

It is clear that the conveyor 439 and the perforating unit 447 can be placed adjacent to another conveyor in the filter cigarette making machine, for example, adjacent to one of the conveyors in the turn-around device 29 of FIG. 1 or adjacent to the conveyor of the testing unit 31 in FIG. 1. It is presently preferred to place the perforating unit 447 adjacent to a conveyor which transports filter cigarettes of double unit length. It is equally possible to place the perforating unit 447 into the interior of the wrapping conveyor 422 or into the conveyor 439.

An advantage of the conveyor 439 is that its belts 439a–439c are not exposed to the beams 450a, and 450b even if some of the flutes 438A which approach the locus B are empty. This is due to the fact that the beams 450a, 450b impinge upon the wrappers of filter plugs 413 in the gaps between the belts 439b, 439c and 439a, 439b.

It is further within the purview of the invention to employ two sources 451 or to divide the beam 450 into four or more beams so that each half of the wrapper of each filter plug 413 is formed with two annuli of holes. Furthermore, the beams 450a, 450b need not impinge upon the wrappers of filter plugs 413 (i.e., upon the convoluted uniting bands). Instead, the holes can be made in the wrapper of tobacco containing section of each cigarette 437 or in the wrappers of tobacco containing sections as well as in the wrapper of the filter plug.

An important advantage of the improved perforating unit 447 is that it can provide the wrappers of filter cigarettes with perforations of desired diameter. Each perforation is bounded by a smooth surface of the wrapper and the perforations are equally spaced apart from each other. Moreover, the transport of filter cigarettes need not be interrupted, i.e., the perforations are formed in the wrappers of cigarettes which form a continuously moving row; the forward movement of successive cigarettes is interrupted only temporarily upon arrival at the locus B and only for an interval of time which is less than that needed for angular movement of the conveyor 424 through a distance equal to that between two consecutive cigarettes upstream of the locus B.

The rolling of cigarettes at the locus B is beneficial on the additional ground that the adhesive on the uniting bands which form the wrappers of filter plugs is even more likely to set, especially since the cylinder 424B is or can be heated to promote the drying of adhesive. The teeth 443A and 439A insure that each cigarette is rolled to the same extent and that the holes in the wrappers of successive cigarettes form identical patterns. The articles are treated gently and are perforated at the same rate at which they leave the wrapping conveyor 422.

Figures 15, 16:
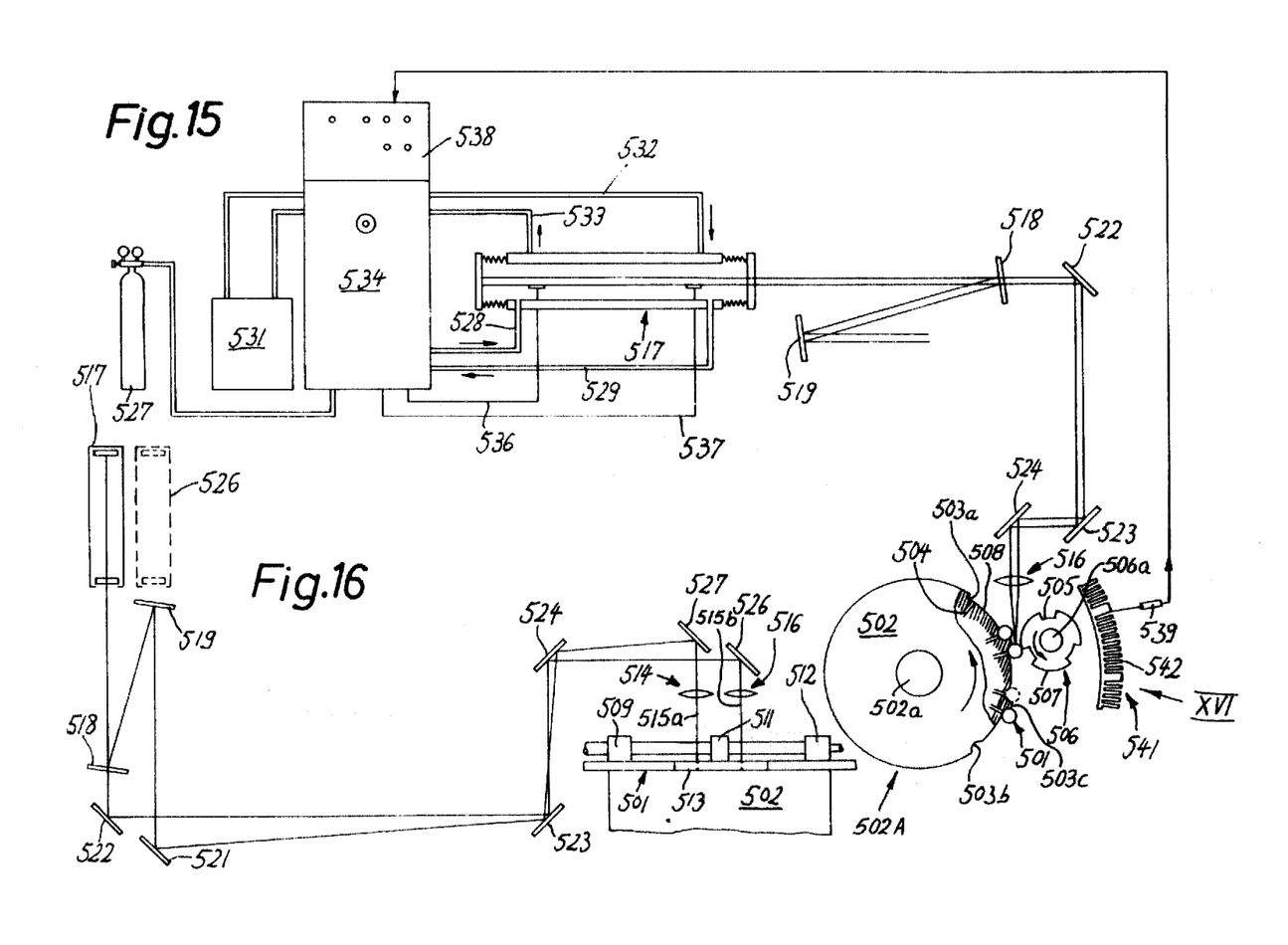
FIG. 15 is a fragmentary elevational view of a filter cigarette making machine which includes a web perforating unit embodying another form of the present invention which constitutes a modification of the perforating unit shown in FIGS. 13 and 14.
FIG. 16 is a view as seen in the direction of arrow XVI in FIG. 15.

FIG. 15 shows a rotary drum-shaped conveyor 502 which is similar to the conveyor 424 of FIG. 14. The conveyor 502 has a cylindrical peripheral surface 502A which is formed with webs 503c extending in parallelism with the axis of the drive shaft 502a for the conveyor 502, with article-receiving flutes 503a each of which is located immediately behind a web 503c, as considered in the direction of rotation of the conveyor 502, and with article-receiving flutes 503b each of which is located immediately in front of a web 503c. The flutes 503a and 503b communicate with suction ports 504 which are machined into the body of the conveyor 502. Each flute 503a and/or 503b can communicate with one, two or more ports 504. Successive flutes 503a receive filter cigarettes 501 of double unit length from a preceding conveyor, e.g., the conveyor 422 of FIG. 13.

A portion of the path along which the cigarettes 501 advance with the conveyor 502 is adjacent to an endless driven rotary drum-shaped conveyor 506 (hereinafter called drum) which constitutes a means for at least reducing the speed of sidewise movement of cigarettes 501 along the path defined by the conveyor 502 by rotating the cigarettes 501 about their respective axes at a perforating station which is shown in FIG. 16 (i.e., the cigarettes can be arrested or move sideways at a reduced speed). The minimum distance between the conveyor 502 and drum 506 at most equals and is preferably somewhat less than the diameter of a cigarette 501. The periphery of the drum 506 is provided with three equally spaced arcuate cigarette-engaging protuberances or lobes 507 which are separated from each other by (i.e., they alternate with) arcuate recesses 505. The shafts 502a and 506a respectively drive the conveyor 502 and the drum 506 in a counterclockwise direction, as viewed in FIG. 15. The convex cigarette-engaging outer surfaces of the lobes 507 cooperate with the sections 508 of the peripheral surface 502A of the conveyor 502 to roll successive filter cigarettes 501 about their respective axes during those intervals when the wrappers or tubes 513 of the filter plugs of cigarettes 501 are subjected to the action of laser beams 515a, 515b, i.e., when such tubes are formed with annuli of perforations. Each section 508 of the peripheral surface 502A of the conveyor 502 extends between a flute 503a and the next-following flute 503b, and the length of each section 508 (as considered in the direction of rotation of the conveyor 502) equals or approximates the length of the convex surface of a lobe 507 (as considered in the circumferential direction of the drum 506).

As shown in FIG. 16, the drum 506 is a composite body consisting of three coaxial spaced-apart elements or disks 509, 511 and 512. Each disk has three lobes 507 and three recesses 506, and each recess and lobe of any one of the disks 509, 511, 512 is in exact register with a recess and a lobe of each of the other two disks. The median disk 511 of the drum 506 is located exactly midway between the disks 509, 512 and exactly midway between the axial ends of the tube 513 which surrounds the filter plug and the adjacent inner end portions of the tobacco-containing sections of a filter cigarette 501 of double unit length. The beam 515a impinges upon the tube 513 in the space between the disks 509, 511 and the beam 515b impinges upon the tube 513 in the space between the disks 511, 512, i.e., the disk 511 is located between the paths of the beams 515a, 515b, as considered transversely of the path which is defined by the surface 502A of the conveyor 502. The beams 515a, 515b are focused upon the filter cigarette 501 at the perforating station by optical systems 514, 516 forming part of a beam splitter for the laser beam 515 issuing from a laser 517. That portion of the beam 515 which constitutes the beam 515a is reflected by a partially reflecting mirror 518 of the beam splitter and is thereupon reflected by mirrors 519, 521, 523, 524 and 527 before it reaches the optical system 514. The other portion of the beam 515 (i.e., the beam 515b) passes through the mirror 518 and is reflected by mirrors 522, 523, 524 and 526 before it reaches the optical system 516. The laser 517 and the mirror 518 can be installed outside of the filter cigarette making machine which includes the conveyor 502. The optical system 514 and the mirrors 521, 526, 527 have been omitted in FIG. 15 for the sake of clarity.

A second laser 526 is indicated in FIG. 16 by broken lines. If the perforating unit comprises two lasers, the mirrors 518 and 519 can be omitted. An advantage of a perforating unit with several lasers or analogous sources of coherent radiation is that, owing to the absence of a beam splitter, the unit operates without losses in output and/or deviations from desired output.

Certain other components of the perforating unit which are associated with the laser 517 are shown schematically in the upper left-hand portion of FIG. 15. Such components include a source 527 of supply of gaseous fluid (e.g., $CO_2$ gas) which is connected with the laser 517 by a supply conduit 528 passing through an energy generating device 534. The latter is further connected to the laser 517 by a return conduit or outlet conduit 529. The reference character 531 denotes a source of coolant which is connected with the laser 517 by a supply conduit 532 and a return conduit 533. The high-voltage conductors between the device 534 and the laser 517 are shown at 536 and 537.

The device 534 is further connected with a control device 538 having an input connected with a proximity switch 539 adjacent the path of movement of tooth-shaped projections 542 on a ring-shaped pulse generator wheel 541. The latter forms part of or rotates with the conveyor 502 at the same angular speed. The wheel 541 can be affixed to one end face of the conveyor 502. A group of say ten projections 542 is associated with each section 508 of the peripheral surface 502A of the conveyor 502. The control device 538 receives a pulse whenever a projection 542 moves past the proximity switch 539.

The operation of the perforating unit of FIGS. 15 and 16 is as follows:

When a filter cigarette 501 of double unit length (in the respective flute 503a) moves into the range of the laser beams 515a and 515b, it is engaged by the leading edge of the peripheral surface of the oncoming lobe 507 on the drum 506 and is dislodged from its flute 503a. The speed of the outer surfaces of lobes 507 equals the speed of the sections 508; therefore, and since the conveyor 502 and drum 506 rotate in the directions indicated by arrows, the cigarette 501 which is engaged by a lobe 507 ceases to move about the shaft 502a, i.e., such cigarette merely rotates about its own axis and rolls along the respective section 508 until it enters the oncoming flute 503b. While a cigarette 501 rotates about its own axis, the proximity switch 539 transmits a certain number of pulses (e.g., ten) so that the laser 517 provides the tube 513 with two annuli of ten perforations each. It is preferred to seal (at least in part) the suction generating device (not shown) from the port or ports 504 of that flute 503a which advances a cigarette 501 to the perforating station of FIG. 16 at the exact moment when the cigarette is engaged by the leading edge of the oncoming lobe 507; this insures that suction in such port does not oppose expulsion of the cigarette from the respective flute 503a. For example, each flute 503a can communicate with two suction ports 504 which are respectively in line with the outer disks 509 and 512 of the drum 506. The ports 504 for the flutes 503b are connected with the intake of the suction generating device when such flutes catch up with cigarettes 501 which are caused to roll about their respective axes at the perforating station. The arrival of a flute 503b at the perforating station takes place simultaneously with arrival of the front portion of a recess 505 which is sufficiently deep to insure that the cigarette 501 which enters a flute 503b cannot be rotated by the drum 506. Consequently, the drum 506 cannot interfere with transport or perforated cigarettes 501 away from the perforating station. The two annuli of perforations in the tube 513 of a cigarette 501 at the perforating station are formed at the opposite sides of the plane where the cigarette 501 is thereupon severed to yield two coaxial filter cigarettes of unit length, i.e., each filter cigarette of unit length is formed with an annulus of equally spaced perforations.

If desired, the sections 508 of the peripheral surface 502A and/or the peripheral surfaces on the lobes 507 on the drum 506 can be roughened (e.g., milled or serrated) to further insure that each cigarette 501 which arrives at the perforating station is compelled to rotate about its axis during exposure of its tube 513 to the beams 515a and 515b.

Figure 17:
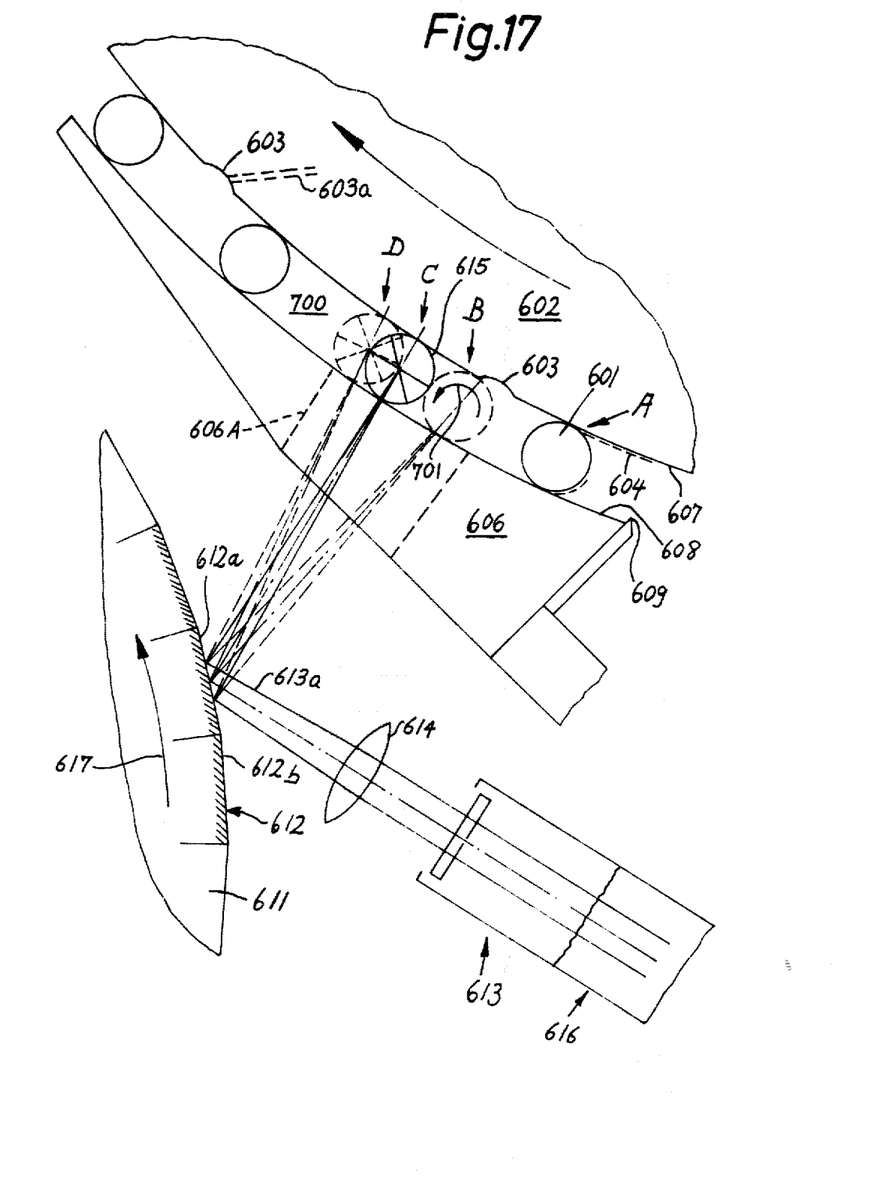
FIG. 17 is a fragmentary elevational view of a filter cigarette making machine which includes still another perforating unit embodying the present invention.

FIG. 17 shows a further perforating unit which makes holes in the wrappers of filter plugs of groups 601 of coaxial rod-shaped articles during travel of such groups in the gap 700 between the cylindrical peripheral surface 607 of a rotary drum-shaped wrapping conveyor 602 (corresponding to the conveyor 22 of FIG. 1) and the concave countersurface 608 of a stationary rolling device or block 606 corresponding to the device 23 of FIG. 1. The peripheral surface 607 of the wrapping conveyor 602 is formed with relatively shallow article-receiving flutes 603 communicating with suction ports 603a which are machined into the body of the conveyor 602. Each group 601 is assumed to include a centrally located filter plug of double unit length and two plain cigarettes of unit length. Furthermore, each group 601 carries an adhesive-coated uniting band 604 (indicated by broken lines). As explained in connection with the transfer conveyor 12 of FIG. 1, this conveyor delivers to the wrapping conveyor successive groups of three coaxial articles each and uniting bands each of which extends substantially tangentially of the respective group and adheres to the respective filter plug of double unit length as well as to the inner end portions of wrappers of the respective plain cigarettes of unit length. If the uniting bands 604 are not attached to the respective groups 601 prior to transfer onto the conveyor 602 of FIG. 17, the peripheral surface 607 is formed with suction ports to attract the uniting bands 604 in optimum positions for attachment to the adjacent groups 601, i.e., for conversion into tubes corresponding to the tube 513 of FIG. 16. The width of the gap 700 between the surfaces 607 and 608 is slightly less than the diameter of the articles of a group 601. The surfaces 607 and 608 are centered at the axis of the conveyor 602. The block 606 carries a ramp or ledge 609 which extends into the inlet of the gap 700 and serves to expel the oncoming groups 601 from the respective flutes 603 in the surface 607, i.e., to initiate the rolling of groups 601 about their respective axes whereby such rolling takes place simultaneously with movement of the groups 601 toward the outlet (left-hand end) of the gap 700.

The block 606 is located between the wrapping conveyor 602 and a drum-shaped rotor 611 having a plurality of flat peripheral facets 612 each of which constitutes an orientation-changing mirror for a laser beam 613a which issues from a laser 613 and is focused by an optical system 614. The block 606 has a cutout 606A which permits the deflected laser beam to pass therethrough and to impinge upon the tubes (converted uniting bands 604) of successive filter cigarettes 615 of double unit length in the gap 700 (each group 601 is converted into a cigarette 615 as soon as the respective uniting band 604 is fully draped therearound). Instead of a single cutout or slot 606A, the block 606 can be formed with several slots, depending on the number of pulses which the laser 613 receives while a cigarette 615 is in the range of the reflected laser beam. The illustrated laser 613 forms perforations in one-half of each tube forming part of a filter cigarette 615, and a second laser 616 forms perforations in the other half of the same tube. This insures that, when the filter cigarettes 615 are thereupon severed to yield pairs of coaxial filter cigarettes of unit length, the mouthpiece of each filter cigarette of unit length is formed with a given number of perforations.

The operation of the perforating unit which is shown in FIG. 17 is as follows:

The transfer conveyor 12 of FIG. 1 delivers groups 601 and uniting bands 604 to successive flutes 603 of the wrapping conveyor 602, and such groups are attracted to the conveyor 602 because the respective ports 603a are then connected to the suction generating device, not shown. Those portions of the uniting bands 604 which do not adhere (as yet) to the respective groups 601 are attracted to or simply lie against the peripheral surface 607 of the conveyor 602. As mentioned above, the surface 607 is preferably formed with suction ports (e.g., one or more annuli of suction ports in register with the filter plugs of successive groups 601) which attract the non-attached portions of successive uniting bands 604 which such uniting bands travel from the transfer conveyor 12 toward the inlet of the gap 700.

The ramp 609 of the block 606 expels successive groups 601 from their flutes 603, and such groups thereupon begin to rotate about their respective axes because the width of the gap 700 is less than the diameter of a group. The direction in which the groups 601 rotate about their axes is indicated by the arrow 701. Such rotation (rolling along the surfaces 607, 608) results in conversion of uniting bands 604 into tubes corresponding to the tube 513 of FIG. 16. The arrow A denotes a location where a portion of the uniting band 604 still adheres to the peripheral surface 607. The conversion of such uniting band into a tube is completed at the location B, i.e., the group 601 and its uniting band 604 then form a filter cigarette 615 of double unit length. Since the flutes 603 are rather shallow, and since the ports 603a for such flutes are disconnected from the suction generating device during travel from the ramp 609 and at least to the location B, a group 601, and thereupon the respective cigarette 615, can continue to roll about its axis even while it is being bypassed by one or more flutes 603.

The lasers 613 and 616 are activated as soon as a group 601 (actually a freshly formed filter cigarette 615 of double unit length) reaches the location B in the gap 700. The manner in which the lasers 613 and 616 are activated is identical with or analogous to the aforedescribed modes of activation of lasers. The beams which issue from the lasers 613, 616 impinge upon the facet 612a at a certain angle and are reflected diametrically against the cigarette 615 at the location B, i.e., such beams intersect the axis of the cigarette 615 at B. The intensity and/or duration of the two laser beams is selected in such a way that each reflected beam passes all the way through the tube by making a hole in the confined filter plug of double unit length of the cigarette 615 at the location B. In other words, each reflected beam forms the tube (converted uniting band 604) with two perforations which are disposed diametrically opposite each other.

When the thus perforated cigarette 615 reaches the location C in the gap 700, the mirror or facet 612a has advanced through a predetermined distance in the direction indicated by arrow 617. The lasers 613 and 616 are then activated again, and the orientation of the resulting beams is different from the orientation of the previously emitted beams, i.e., the freshly emitted beams are reflected by the mirror 612a in such a way that they again form holes extending all the way across the filter plug of the cigarette 615 at C, i.e., each half of the tube of such cigarette is formed with a second pair of perforations which are located diametrically opposite each other and are angularly offset with respect to the perforations formed at the location B. The lasers 613 and 616 receive a third impulse when the cigarette 615 reaches the location D, and the oreintation of the laser beams which are reflected by the mirror 612a is then such that the reflected laser beams again traverse the filter plug to provide the tube with two pairs of additional perforations, one perforation of each pair being located diametrically opposite the other perforation of the same pair. Such perforations are angularly offset with respect to perforations which are formed at the locations B and C. The twelve perforations in the tube of the cigarette 615 advancing beyond the location D form two annuli wherein the perforations are preferably equidistant from each other.

It is clear that the number of perforations in each annulus can be increased to more than six or reduced to less than six, depending on the number of pulses which are transmitted to the lasers 613 and 616 while a mirror (such as 612a or 612b) is located in the path of laser beams.

The mirror 612b enters the path of laser beams immediately after the preceding mirror 612a leaves such path, and the mirror 612b is then ready to direct laser beams against the tube of the next filter cigarette 615. The intervals between transmission of successive series of pulses to the lasers 613 and 616 are sufficiently long to insure that successive groups 601 and the respective uniting bands 604 can be converted into filter cigarettes 615 before the respective mirrors 612 of the rotor 611 begin to reflect laser beams.

Without further analysis, the foregoing will so fully reveal the gist of the present invention that others can, by applying current knowledge, readily adapt it for various applications without omitting features that, from the standpoint of prior art, fairly constitutes essential characteristics of the generic and specific aspects of our contribution to the art and, therefore, such adaptations should and are intended to be comprehended within the meaning and range of equivalence of the appended claims.

What is claimed is:

1. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; means for directing said beam against successive wrappers in said path whereby the wrappers are perforated at the points of impingement of said beam, said drive means including conveyor means for moving a succession of articles sideways past said beam directing means; and means for temporarily interrupting the sidewise movement of articles along said path while the articles are in register with said beam directing means and for simultaneously rotating the arrested articles about their respective axes.

2. A combination as defined in claim 1, wherein said movement interrupting means comprises an endless conveyor adjacent to said path opposite said conveyor means.

3. A combination as defined in claim 1, wherein said source is a laser.

4. A combination as defined in claim 1, wherein said source is operable to emit a plurality of laser beams so that each article is provided with several groups of perforations.

5. A combination as defined in claim 4, wherein said conveyor means is hollow and said source is disposed in the interior of said conveyor means.

6. A combination as defined in claim 1, wherein said movement interrupting means comprises at least one endless belt having an outer side provided with alternating raised and recessed portions, said belt being adjacent to said path opposite said conveyor means and said raised portions being sufficiently close to said conveyor means to rotate successive articles in cooperation with said conveyor means upon arrival of such articles at a locus of register with said beam directing means.

7. A combination as defined in claim 6, wherein said conveyor means includes a rotary drum having a peripheral surface provided with alternating first and second article-receiving means, said surface having sections disposed between successive first and second receiving means and further comprising means for delivering articles to successive first receiving means at a station located ahead of said beam directing means, said raised portions of said belt being arranged to expel successive articles from the respective first receiving means and to cooperate with the surface sections following such first receiving means to roll the expelled articles about their respective axes until the articles are accepted by the oncoming second receiving means.

8. A combination as defined in claim 1, wherein said movement interrupting means comprises at least one endless toothed belt conveyor.

9. A combination as defined in claim 1, wherein said movement interrupting means comprises at least two spaced apart parallel endless belt conveyors disposed opposite said conveyor means, the articles which move along said path having portions extending transversely across the space between said belt conveyors and said beam directing means being in line with such portions of successive articles.

10. A combination as defined in claim 1; and further comprising means for operating said source in synchronism with said drive means to cause said beam to perforate selected portions of successive wrappers.

11. A combination as defined in claim 10, wherein said operating means includes means for operating said radiation source a predetermined number of times whenever an article rotates about its axis.

12. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; means for directing said beam against successive wrappers in said path whereby the wrappers are perforated at the points of impingement of said beam, said drive means including conveyor means for moving a succession of rod-shaped articles sideways past said beam directing means; and means for temporarily reducing the speed of sidewise movement of successive articles along said path while the articles are in register with said beam directing means and for simultaneously rotating the articles about their respective axes.

13. A combination as defined in claim 12, wherein said speed reducing means comprises an endless conveyor adjacent to said path opposite said conveyor means, said endless conveyor having a periphery provided with article-engaging protuberances and recesses alternating with said protuberances.

14. A combination as defined in claim 13, wherein said endless conveyor is a rotary drum.

15. A combination as defined in claim 13, wherein said conveyor means comprises pairs of article receiving means, each pair including a first receiving means which transports an article sideways toward the position of register with said beam directing means and second receiving means which is spaced apart from said first receiving means, as considered in the direction of movement of said conveyor means, and transports such article away from the position of register with said beam directing means, said protuberances including article-engaging surfaces having a length, as considered in the direction of movement of said endless conveyor, which at least approximates the distance between said first and second receiving means of a pair of receiving means on said conveyor means.

16. A combination as defined in claim 13, wherein said beam directing means includes means for splitting said beam into several beams including first and second beams which are spaced apart from each other, as considered transversely of said path, and said endless conveyor comprises three spaced apart coaxial elements including a median element disposed between the paths of said first and second beams.

17. A combination as defined in claim 13, wherein said source of coherent radiation comprises first and second lasers respectively operable to emit first and second beams and said beam directing means includes first and second portions respectively arranged to direct said first and second beams against successive articles along discrete first and second paths, said endless conveyor comprising three spaced apart coaxial elements including a median element disposed between said first and second paths.

18. A combination as defined in claim 12, and further comprising means for operating said source in synchronism with said drive means to cause said beam to perforate selected portions of successive wrappers.

19. A combination as defined in claim 18, wherein said operating means includes means for operating said radiation source a predetermined number of times whenever an article rotates about its axis.

20. In a machine for the production and/or processing of rod-shaped articles which constitute or form part of smokers' products and wherein a wrapper surrounds a rod-like filler, a combination comprising drive means for moving a succession of wrappers along a predetermined path; at least one source of coherent radiation operable to emit at least one beam of coherent radiation; and means for directing said beam against successive wrappers in said path whereby the wrappers are perforated at the points of impingement of said beam, said drive means including conveyor means for moving a succession of articles sideways past said beam directing means and said beam directing means including means for changing the orientation of said beam so that the latter impinges against each of said succession of articles at several locations along said path.

21. A combination as defined in claim 20, further comprising means for rolling successive articles about their respective axes during travel at and between said locations.

22. A combination as defined in claim 21, wherein said rolling means is stationary.

23. A combination as defined in claim 21, wherein said orientation changing means includes means for causing said beam to impinge upon the articles at said locations for intervals which suffice to form holes extending transversely across the articles.

24. A combination as defined in claim 21, wherein said source of coherent radiation includes a laser arranged to emit a beam of such intensity that the beam forms holes extending transversely across the articles at said locations.

25. A combination as defined in claim 20, wherein said beam directing means comprises a rotor and said orientation changing means comprises flat mirrors at the periphery of said rotor.

26. A combination as defined in claim 20, further comprising means for rolling successive articles about their respective axes during travel at and between said locations, said orientation changing means including means for directing said beam diametrically against the articles at said locations.

27. A combination as defined in claim 20; and further comprising means for operating said source in synchronism with said drive means to cause said beam to perforate selected portions of successive wrappers.

* * * * *